United States Patent
Richter

(10) Patent No.: US 12,062,207 B2
(45) Date of Patent: Aug. 13, 2024

(54) LOW BANDWIDTH TRANSMISSION OF EVENT DATA

(71) Applicant: Apple Inc., Cupertino, CA (US)

(72) Inventor: Ian M. Richter, Los Angeles, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/237,616

(22) Filed: Aug. 24, 2023

(65) Prior Publication Data
US 2024/0046507 A1 Feb. 8, 2024

Related U.S. Application Data

(63) Continuation of application No. 17/014,300, filed on Sep. 8, 2020, now Pat. No. 11,749,027, which is a
(Continued)

(51) Int. Cl.
| | |
|---|---|
| *G06T 7/73* | (2017.01) |
| *G06N 3/02* | (2006.01) |
| *G06T 7/292* | (2017.01) |
| *G06T 13/40* | (2011.01) |
| *G06V 10/40* | (2022.01) |
| *G06V 10/44* | (2022.01) |
| *G06V 10/764* | (2022.01) |
| *G06V 10/82* | (2022.01) |
| *G06V 20/52* | (2022.01) |

(Continued)

(52) U.S. Cl.
CPC .............. *G06T 7/73* (2017.01); *G06N 3/02* (2013.01); *G06T 7/292* (2017.01); *G06T 13/40* (2013.01); *G06V 10/40* (2022.01); *G06V 10/454* (2022.01); *G06V 10/764* (2022.01); *G06V 10/82* (2022.01); *G06V 20/52* (2022.01); *G06V 40/103* (2022.01); *G06V 40/23* (2022.01); *H04L 65/80* (2013.01); *G06T 2207/10016* (2013.01); *G06T 2207/30196* (2013.01)

(58) Field of Classification Search
CPC ...... G06V 40/10; G06V 40/103; G06V 40/23; G06Q 50/01; H04L 5/403
See application file for complete search history.

(56) References Cited

U.S. PATENT DOCUMENTS

| | | | |
|---|---|---|---|
| 5,745,126 A | * | 4/1998 | Jain ...................... H04N 13/156 348/E13.058 |
| 6,671,391 B1 | | 12/2003 | Zhang et al. |

(Continued)

*Primary Examiner* — Yosef Kassa
(74) *Attorney, Agent, or Firm* — Fernando & Partners, LLP

(57) ABSTRACT

Various implementations disclosed herein include devices, systems, and methods for low bandwidth transmission of event data. In various implementations, a device includes one or more cameras, a non-transitory memory, and one or more processors coupled with the one or more cameras and the non-transitory memory. In various implementations, the method includes obtaining, by the device, a set of images that correspond to a scene with a person. In various implementations, the method includes generating pose information for the person based on the set of images. In some implementations, the pose information indicates respective positions of body portions of the person. In some implementations, the method includes transmitting the pose information in accordance with a bandwidth utilization criterion.

25 Claims, 11 Drawing Sheets

Related U.S. Application Data continuation of application No. 16/140,330, filed on Sep. 24, 2018, now Pat. No. 10,810,415.

(60) Provisional application No. 62/734,188, filed on Sep. 20, 2018, provisional application No. 62/620,366, filed on Jan. 22, 2018.

(51) Int. Cl.
*G06V 40/10* (2022.01)
*G06V 40/20* (2022.01)
*H04L 65/80* (2022.01)

(56) References Cited

U.S. PATENT DOCUMENTS

| | | |
|---|---|---|
| 6,707,933 B1 | 3/2004 | Mariani et al. |
| 6,741,756 B1 | 5/2004 | Toyama et al. |
| 6,929,548 B2 * | 8/2005 | Wang .................. A63F 13/219 |
| | | 463/36 |
| 7,008,373 B2 | 3/2006 | Stoianovici et al. |
| 7,194,369 B2 | 3/2007 | Lundstedt et al. |
| 7,272,243 B2 | 9/2007 | Toyama |
| 7,321,854 B2 | 1/2008 | Sharma et al. |
| 7,536,647 B2 * | 5/2009 | Walker .................. G06F 16/252 |
| | | 715/748 |
| 7,680,314 B2 | 3/2010 | Hong |
| 7,731,091 B2 | 6/2010 | Knowles et al. |
| 7,787,028 B2 | 8/2010 | Kojo |
| 7,881,878 B2 | 2/2011 | Burrus et al. |
| 7,940,960 B2 | 5/2011 | Okada |
| 7,987,111 B1 | 7/2011 | Sharma et al. |
| 8,139,067 B2 | 3/2012 | Anguelov et al. |
| 8,289,185 B2 | 10/2012 | Alonso |
| 8,480,471 B2 | 7/2013 | Lutnick et al. |
| 8,498,023 B2 | 7/2013 | Suzuki |
| 8,649,193 B2 | 2/2014 | Sakai et al. |
| 8,805,579 B2 | 8/2014 | Skrinde |
| 8,824,730 B2 | 9/2014 | Jouppi et al. |
| 8,884,741 B2 | 11/2014 | Cavallaro et al. |
| 8,918,209 B2 | 12/2014 | Rosenstein et al. |
| 9,049,259 B2 * | 6/2015 | Rathod .................. H04L 65/403 |
| 9,094,615 B2 | 7/2015 | Aman et al. |
| 9,454,006 B2 | 9/2016 | Kobayashi |
| 9,778,155 B2 | 10/2017 | Gradinaru et al. |
| 10,289,929 B2 * | 5/2019 | Dill .................. F21V 23/0471 |
| 10,565,731 B1 * | 2/2020 | Reddy .................. G06F 3/012 |

* cited by examiner

LOW BANDWIDTH TRANSMISSION OF EVENT DATA

CROSS REFERENCE TO RELATED APPLICATIONS

This application is a continuation application of and claims priority to U.S. patent application Ser. No. 17/014,300, filed on Sep. 8, 2020, which is a continuation application of and claims priority to U.S. patent application Ser. No. 16/140,330, filed on Sep. 24, 2018, which claims priority to U.S. patent application No. 62/620,366, filed on Jan. 22, 2018, and U.S. patent application No. 62/734,188, filed on Sep. 20, 2018, which are hereby incorporated by reference in their entirety.

TECHNICAL FIELD

The present disclosure generally relates to transmission of event data and, in particular, to low bandwidth transmission of event data.

BACKGROUND

Some devices are capable of capturing images and transmitting the images over a network. Some devices capture video and transmit the video in real-time over a network. For example, some cameras or smartphones with cameras capture video and transmit the video to another device. Some devices broadcast the captured video to a number of other devices. For example, some television cameras capture video at an event and broadcast the video via a television channel, a website, or a streaming service. Transmitting video over a network sometimes burdens the network because video transmissions tend to require a significant amount of bandwidth. Moreover, as the demand for high definition video increases, networks will be increasingly burdened by video traffic.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
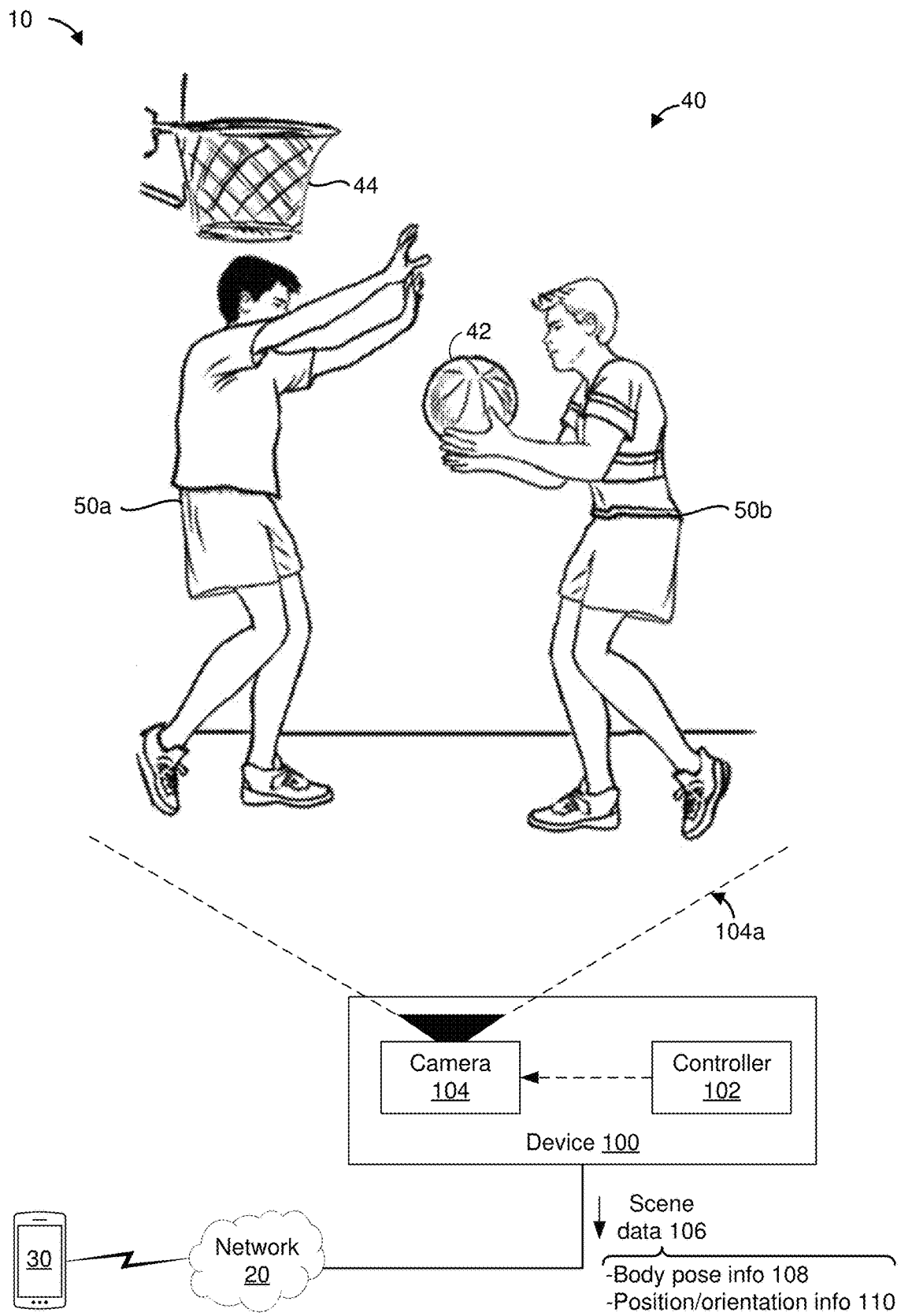
FIGS. 1A-1B are diagrams of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for low bandwidth transmission of event data. In various implementations, a device includes one or more cameras, a non-transitory memory, and one or more processors coupled with the one or more cameras and the non-transitory memory. In various implementations, the method includes obtaining, by the device, a set of images that correspond to a scene with a person. In various implementations, the method includes generating pose information for the person based on the set of images. In some implementations, the pose information indicates respective positions of body portions of the person. In some implementations, the method includes transmitting the pose information in accordance with a bandwidth utilization criterion.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

The present disclosure provides methods, systems, and/or devices that enable low bandwidth transmission of event data. When a scene includes a person, body pose information of the person is determined and transmitted instead of an image of the person. The body pose information indicates a current body pose of the person. The body pose information includes positions and/or angles of various joints of the person. The body pose information also indicates positions and/or angles of various body portions such as the neck, the torso, the arms, and the legs of the person. Transmitting the body pose information requires less bandwidth than transmitting an image of the person, and sometimes significantly less bandwidth. As such, transmitting the body pose information rather than an image helps alleviate the stress on a bandwidth-constrained network. The receiving device creates an avatar of the person based on the body pose information.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1A is a diagram of an example operating environment 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 10 includes a network 20, a user device 30, a real-world scene 40 ("scene 40", hereinafter for the sake of brevity), and a device 100.

In the example of FIG. 1A, the scene 40 corresponds to a basketball game. As such, the scene 40 includes a ball 42, a hoop 44, and persons 50a and 50b that are playing basketball. While the scene 40 illustrates two people, in some implementations, the scene 40 includes fewer or more people. For example, in some implementations, the scene 40 includes all ten active (e.g., current playing) players, players sitting on the benches, and some audience members (e.g., fans) in the background.

In various implementations, the device 100 captures a set of images of the scene and transmits scene data 106 to the user device 30 over the network 20. In some implementations, the device 100 includes a controller 102 and a camera 104. In some implementations, the camera 104 captures the set of images, and the controller 102 generates the scene data 106 based on the set of images. In some implementations, the scene data 106 includes body pose information 108 for persons that are in a field of view 104a of the camera 104. In some implementations, the scene data 106 includes position/orientation information 110 for various objects that are in the field of view 104a of the camera 104 (e.g., the ball 42 and the hoop 44).

In various implementations, the body pose information 108 indicates body poses of the persons 50a and 50b that are in the field of view 104a of the camera 104. For example, in some implementations, the body pose information 108 indicates joint positions and/or joint orientations of the persons 50a and 50b (e.g., positions/orientations of shoulder joints, elbow joints, wrist joints, pelvic joint, knee joints and ankle joints). In some implementations, the body pose information 108 indicates positions/orientations of various body portions of the persons 50a and 50b (e.g., positions/orientations of head, torso, upper arms, lower arms, upper legs and lower legs).

In various implementations, transmitting the scene data 106 (e.g., the body pose information 108 and/or the position/orientation information 110) over the network 20 consumes less bandwidth than transmitting images captured by the camera 104. In some implementations, network resources are limited, and the device 100 has access to an available amount of bandwidth. In such implementations, transmitting the scene data 106 consumes less than the available amount of bandwidth, whereas transmitting images captured by the camera 104 may consume more than the available amount of bandwidth. In various implementations, transmitting the scene data 106 (e.g., instead of transmitting images) improves the operability of the network 20, for example, by utilizing fewer network resources (e.g., by utilizing less bandwidth).

In various implementations, the user device 30 utilizes the scene data 106 to generate a computer-generated reality (CGR) version of the scene 40. For example, in some implementations, the user device 30 utilizes the body pose information 108 to render avatars of the persons 50a and 50b. In some implementations, the user device 30 provides the body pose information 108 to a display engine (e.g., a rendering and display pipeline) that utilizes the body pose information 108 to render avatars of the persons 50a and 50b. Since the user device 30 utilizes the body pose information 108 to render the avatars, the body pose of the avatars is within a degree of similarity to the body pose of the persons 50a and 50b at the scene 40. As such, viewing the avatars is within a degree of similarity to viewing the images of the scene 40.

Figure 1B:
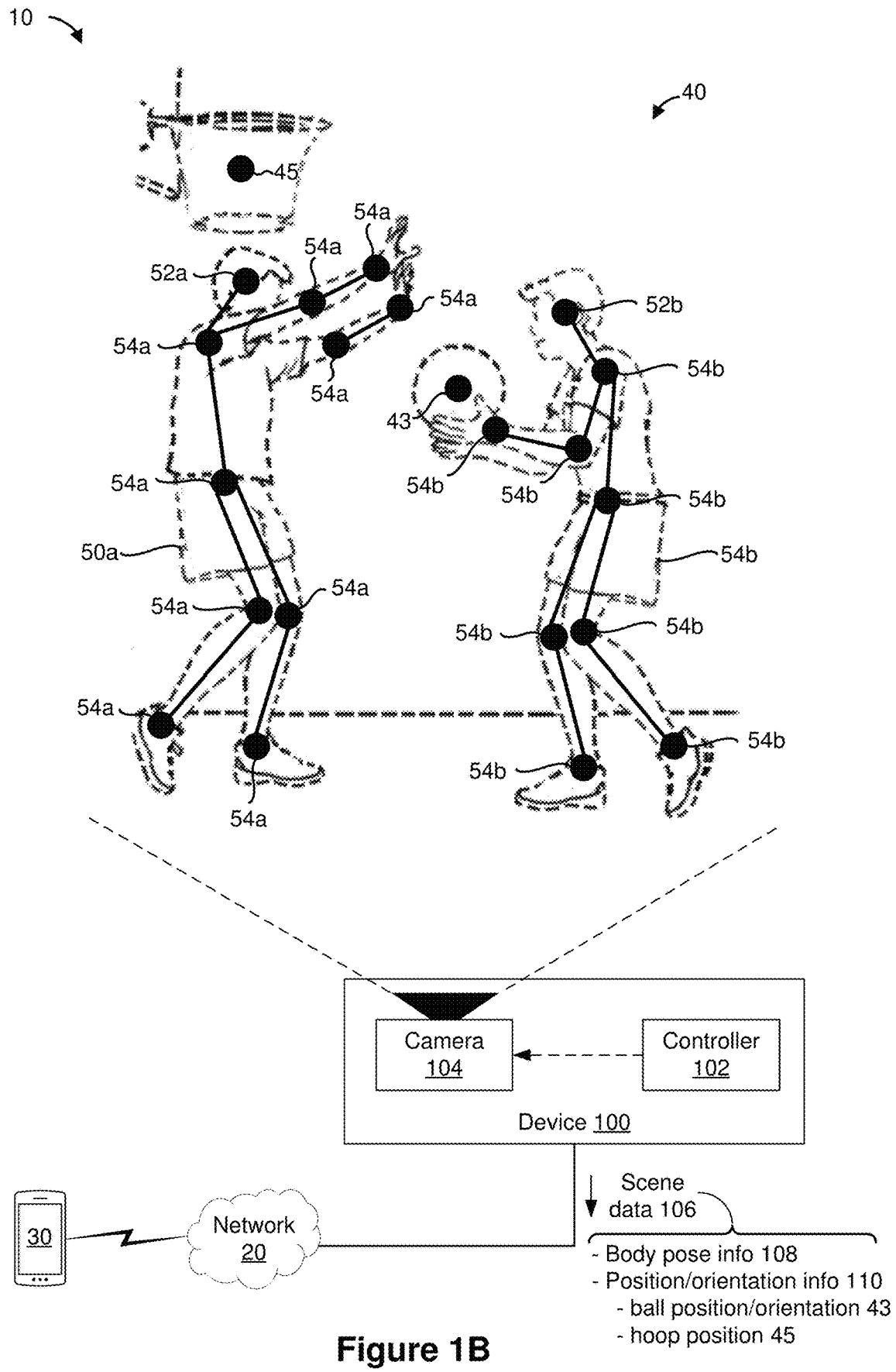

Referring to FIG. 1B, in some implementations, the device 100 (e.g., the camera 104 and/or the controller 102) identifies various body portions of the persons 50a and 50b. In the example of FIG. 1B, the device 100 identifies heads 52a and 52b of the persons 50a and 50b, respectively. In some implementations, the device 100 determines the positions/orientations of the heads 52a and 52b. As shown in FIG. 1B, in some implementations, the device 100 identifies various joints 54a and 54b of the persons 50a and 50b respectively. In some implementations, the device 100 determines the positions/orientations of the joints 54a and 54b. In the example of FIG. 1B, the body pose information 108 includes positions/orientations of the heads 52a and 52b, and the joints 54a and 54b.

In some implementations, the scene data 106 includes positions/orientations of other objects that are located within the scene 40. In the example of FIG. 1B, the scene data 106 includes a ball position/orientation 43 that indicates a position/orientation of the ball 42. In the example of FIG. 1B, the scene data 106 also includes a hoop position 45 that indicates a position of the hoop 44. Since the positions/orientations of other objects is part of the scene data 106, the user device 30 utilizes the positions/orientations to render visual representations of the objects. For example, in the example of FIG. 1B, the user device 30 utilizes the ball position/orientation 43 to present a visual representation of the ball 42. Similarly, in the example of FIG. 1B, the user device 30 utilizes the hoop position 45 to present a visual representation of the hoop 44. Since the visual representations of the objects are based on the positions/orientations of the objects, the visual representations are within a degree of similarity to the positions/orientations indicated by the images captured by the camera 104. As such, in various implementations, transmitting the positions/orientations of objects at the scene 40 improves the operability of the network 20 by reducing the amount of bandwidth utilization.

Figure 2:
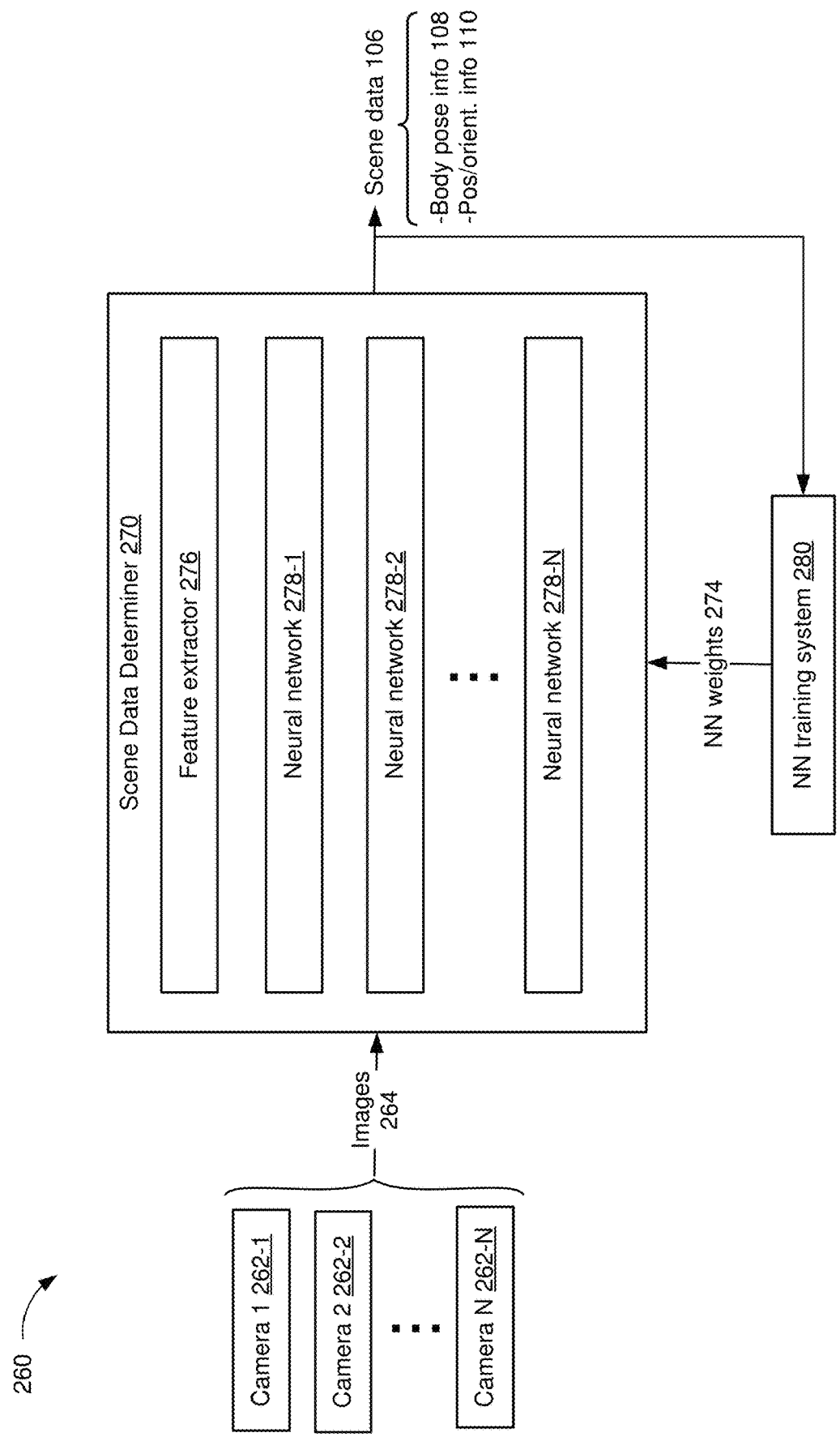
FIG. 2 is a block diagram of an example scene data determiner in accordance with some implementations.

FIG. 2 is a block diagram of an example system 260 for determining the scene data 106. To that end, the system 260 includes cameras 262-1, 262-2 . . . 262-N, a scene data determiner 270, and a neural network training system 280. In various implementations, the cameras 262-1, 262-2 . . . 262-N provide images 264 to the scene data determiner 270, the scene data determiner 270 determines the scene data 106 based on the images 264, and the neural network training system 280 trains neural networks that the scene data determiner 270 utilizes.

In some implementations, the cameras 262-1, 262-2 . . . 262-N are part of different devices. For example, in some implementations, the camera 262-1 represents the camera 104 shown in FIGS. 1A-1B, and the remaining cameras 262-2 . . . 262-N are dispersed throughout the scene 40. In some implementations, the cameras 262-1, 262-2 . . . 262-N are attached to different parts of a person's body. For example, in some implementations, the camera 262-1 is attached to a head-mountable device that is worn around the head of the user, and the camera 262-2 is attached to a foot of the user. In various implementations, the cameras 262-1, 262-2 . . . 262-N generate the images 264, and provide the images 264 to the scene data determiner 270.

In various implementations, the scene data determiner 270 determines the body pose information 108 for one or more persons. In the example of FIG. 2, the scene data determiner 270 includes a feature extractor 276 and one or more neural networks 278-1 . . . 278-N. In some implementations, the feature extractor 276 extracts various features from the images 264, and provides the features to the one or more neural networks 278-1 . . . 278-N in the form of a feature vector (e.g., the feature vector 302 shown in FIG. 3A). In various implementations, the one or more neural networks 278-1 . . . 278-N receive the feature vector as an input, and determine the body pose information 108 and/or the position/orientation information 110 based on the feature vector.

In various implementations, the neural network training system 280 trains the one or more neural networks 278-1 . . . 278-N during a training phase. For example, in some implementations, the neural network training system 280 determines neural network weights 274, and provides the neural network weights 274 to the one or more neural networks 278-1 . . . 278-N. In some implementations, the neural network training system 280 utilizes validated training data to determine the neural network weights 274 and trains the one or more neural networks 278-1 . . . 278-N. For example, in some implementations, the neural network training system 280 has access to labeled body poses. In such implementations, the neural network training system 280 utilizes the labeled body poses to train the one or more neural networks 278-1 . . . 278-N, and determines the neural network weights 274. In some implementations, the neural network training system 280 utilizes the scene data 106 generated by the scene data determiner 270 in order to adjust the neural network weights 274. As such, in some implementations, the neural network training system 280 continuously/periodically re-calibrates the one or more neural networks 278-1 . . . 278-N so that the scene data 106 generated by the scene data determiner 270 is within a degree of accuracy.

While the example of FIG. 2 illustrates a particular number of neural networks, a person of ordinary skill in the art will appreciate from the present disclosure that, in some implementations, the scene data determiner 270 includes fewer or additional neural networks. In some implementations, each of the one or more neural networks 278-1 . . . 278-N corresponds to a different body portion. For example, in some implementations, the neural network 278-1 corresponds to the neck of a person, and the neural network 278-2 corresponds to the torso of a person. In such implementations, the neural network 278-1 determines the position/orientation of the neck, and the neural network 278-2 determines the position/orientation of the torso. In some implementations, each of the one or more neural networks 278-1 . . . 278-N corresponds to a different object. For example, in some implementations, the neural network 278-1 corresponds to the ball 42, whereas the neural network 278-2 corresponds to the hoop 44. In such implementations, the neural network 278-1 determines the position/orientation of the ball 42, and the neural network 278-2 determines the position/orientation of the hoop 44.

Figure 3A:
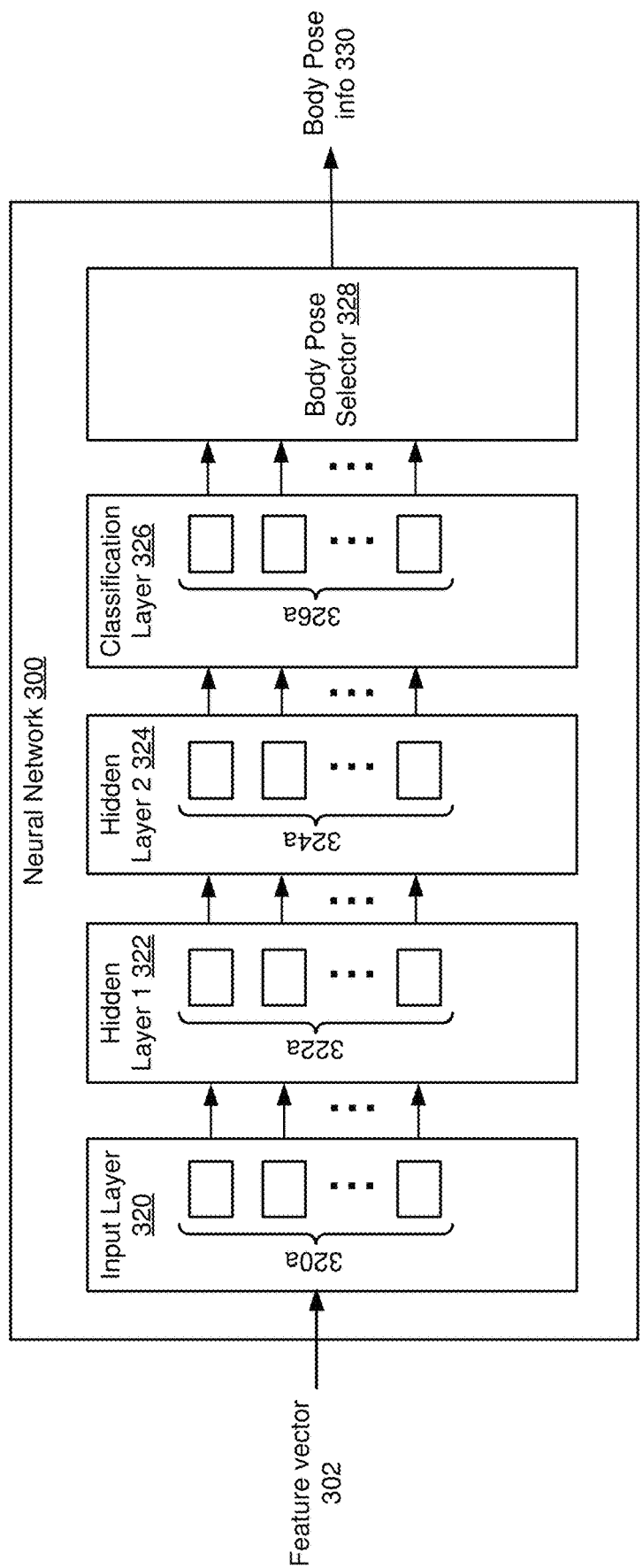
FIGS. 3A-3B are block diagrams of example neural network systems in accordance with some implementations.

FIG. 3A is a block diagram of a neural network 300 in accordance with some implementations. In some implementations, the neural network 300 implements each of the one or more neural networks 278-1 . . . 278-N shown in FIG. 2. In various implementations, the neural network 300 receives a feature vector 302, and generates body pose information 330 (e.g., the body pose information 108 shown in FIGS. 1A-2) based on the feature vector 302.

In the example of FIG. 3A, the neural network 300 includes an input layer 320, a first hidden layer 322, a second hidden layer 324, a classification layer 326, and a body pose selector 328. While the neural network 300 includes two hidden layers as an example, those of ordinary skill in the art will appreciate from the present disclosure that one or more additional hidden layers are also present in various implementations. Adding additional hidden layers adds to the computational complexity and memory demands, but may improve performance for some applications.

In various implementations, the input layer 320 is coupled to receive various inputs. In some implementations, the input layer 320 receives the feature vector 302 as input. In some implementations, the input layer 320 receives images as input (e.g., the images 264 shown in FIG. 2). In some such implementations, the input layer 320 generates the feature vector 302 based on the images. In various implementations, the input layer 320 includes a number of long short term memory (LSTM) logic units 320a, which are also referred to as neurons by those of ordinary skill in the art. In some such implementations, an input matrix from the features of the feature vector 302 to the LSTM logic units 320a include rectangular matrices. The size of a matrix is a function of the number of features included in the feature stream.

In some implementations, the first hidden layer 322 includes a number of LSTM logic units 322a. In some implementations, the number of LSTM logic units 322a ranges between approximately 10-500. Those of ordinary skill in the art will appreciate that, in such implementations, the number of LSTM logic units per layer is orders of magnitude smaller than previously known approaches (being of the order of $O(10^1)$-$O(10^2)$), which allows such implementations to be embedded in highly resource-constrained devices. As illustrated in the example of FIG. 3A, the first hidden layer 322 receives its inputs from the input layer 320.

In some implementations, the second hidden layer 324 includes a number of LSTM logic units 324a. In some implementations, the number of LSTM logic units 324a is the same as or is similar to the number of LSTM logic units 320a in the input layer 320 or the number of LSTM logic units 322a in the first hidden layer 322. As illustrated in the example of FIG. 3A, the second hidden layer 324 receives its inputs from the first hidden layer 322. Additionally or alternatively, in some implementations, the second hidden layer 324 receives its inputs from the input layer 320.

In some implementations, the classification layer 326 includes a number of LSTM logic units 326a. In some implementations, the number of LSTM logic units 326a is the same as or is similar to the number of LSTM logic units 320a in the input layer 320, the number of LSTM logic units 322a in the first hidden layer 322, or the number of LSTM logic units 324a in the second hidden layer 324. In some implementations, the classification layer 326 includes an implementation of a multinomial logistic function (e.g., a soft-max function) that produces a number of outputs that is approximately equal to a number of possible body poses. In some implementations, each output includes a probability or a confidence measure for the corresponding body pose.

In some implementations, the body pose selector 328 generates the body pose information 330 by selecting the top N body pose candidates provided by the classification layer 326. In some implementations, the body pose selector 328 selects the top body pose candidate provided by the classification layer 326. For example, in some implementations, the body pose selector 328 selects the body pose candidate that is associated with the highest probability or confidence measure. In some implementations, the body pose information 330 is transmitted to another device (e.g., the user device 30 shown in FIGS. 1A and 1B), so that the other device(s) can utilize the body pose information 330 to present an avatar with the body pose indicated by the body pose information 330.

In some implementations, the body pose information 330 is provided to another neural network that utilizes the body pose information 330 to determine additional body pose information. For example, referring to the example of FIG. 2, in some implementations, the neural network 278-1 provides body pose information regarding the neck to the neural network 278-2 so that the neural network 278-2 can utilize the body pose information regarding the neck to determine body pose information for the torso. In various implementations, different body pose information from different neural networks is combined to generate an overall body pose for the person. For example, in some implementations, the body pose information for the neck, shoulders, arms, torso, and legs is combined to provide an overall body pose of the person.

Figure 3B:
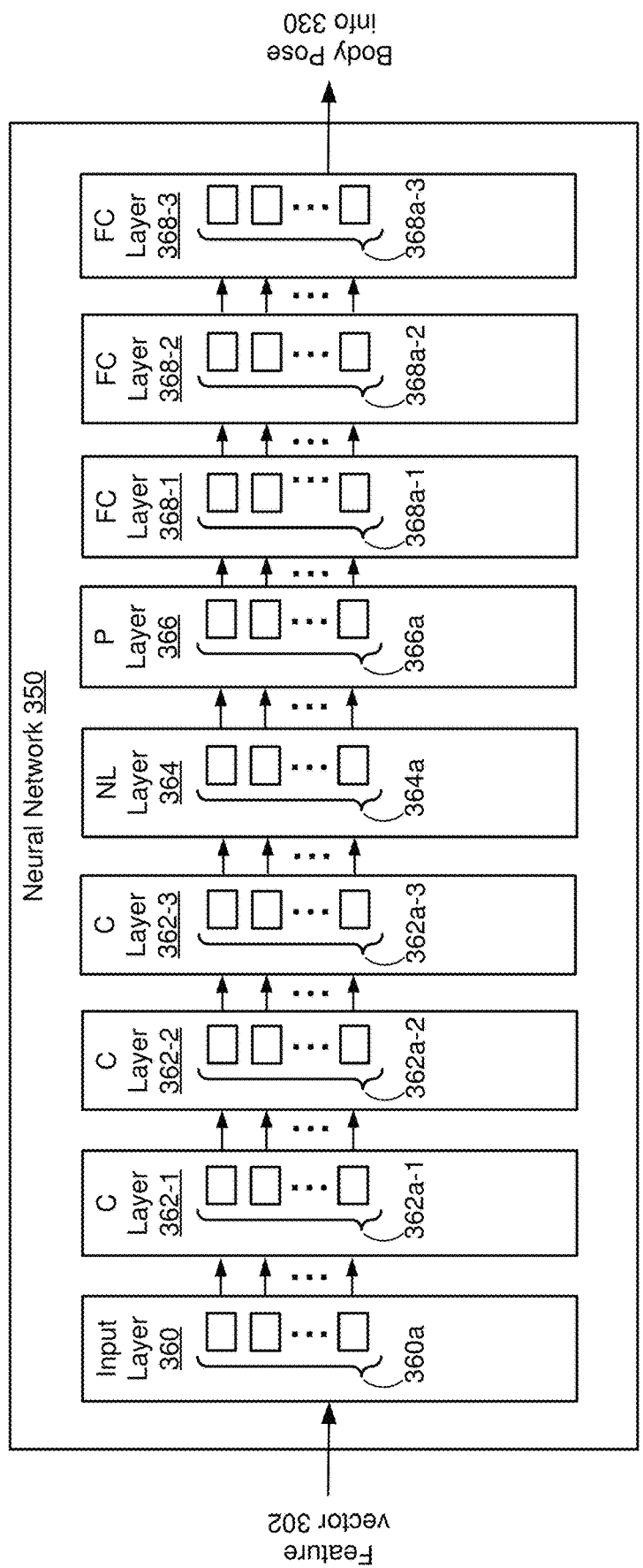

FIG. 3B illustrates a block diagram of an example neural network 350. In some implementations, the neural network 350 implements each one of the one or more neural networks 278-1 . . . 278-N. In various implementations, the neural network 350 receives the feature vector 302 and generates the body pose information 330. In various implementations, the neural network 350 includes a convolutional neural network (CNN). To that end, the neural network 350 includes an input layer 360, convolution layers 362-1, 362-2, and 362-3, a non-linear layer 364, a pooling layer 366, and fully-connected layers 368-1, 368-2, and 368-3. In some implementations, the input layer 360, the convolution layers 362-1, 362-2, and 362-3, the non-linear layer 364, the pooling layer 366, and the fully-connected layers 368-1, 368-2, and 368-3 include respective neurons 360a, 362a-1, 362a-2, 362a-3, 364a, 366a, 368a-1, 368a-2, and 368a-3.

In the example of FIG. 3B, the neural network 350 includes three convolution layers 362-1, 362-2, and 362-3, and three fully-connected layers 368-1, 368-2, and 368-3. A person of ordinary skill in the art will appreciate from the present disclosure that, in some implementations, the neural network 350 includes fewer or more convolution and/or fully-connected layers. In some implementations, neural networks that model certain body portions (e.g., the neck and/or the shoulders) include more convolution and fully-connected layers, whereas neural networks that model other body portions (e.g., the lower arms and/or the lower legs) include fewer convolution and fully-connected layers. In some implementations, body portions closer to the head (e.g., the neck and/or the shoulders) are modeled by neural networks with more convolution/fully-connected layers (e.g., 3, 5, or more convolution/fully-connected layers), and body portions away from the head are modeled by neural networks with fewer convolution/fully-connected layers (e.g., 2 or 1 convolution/fully-connected layers).

Figure 4A:
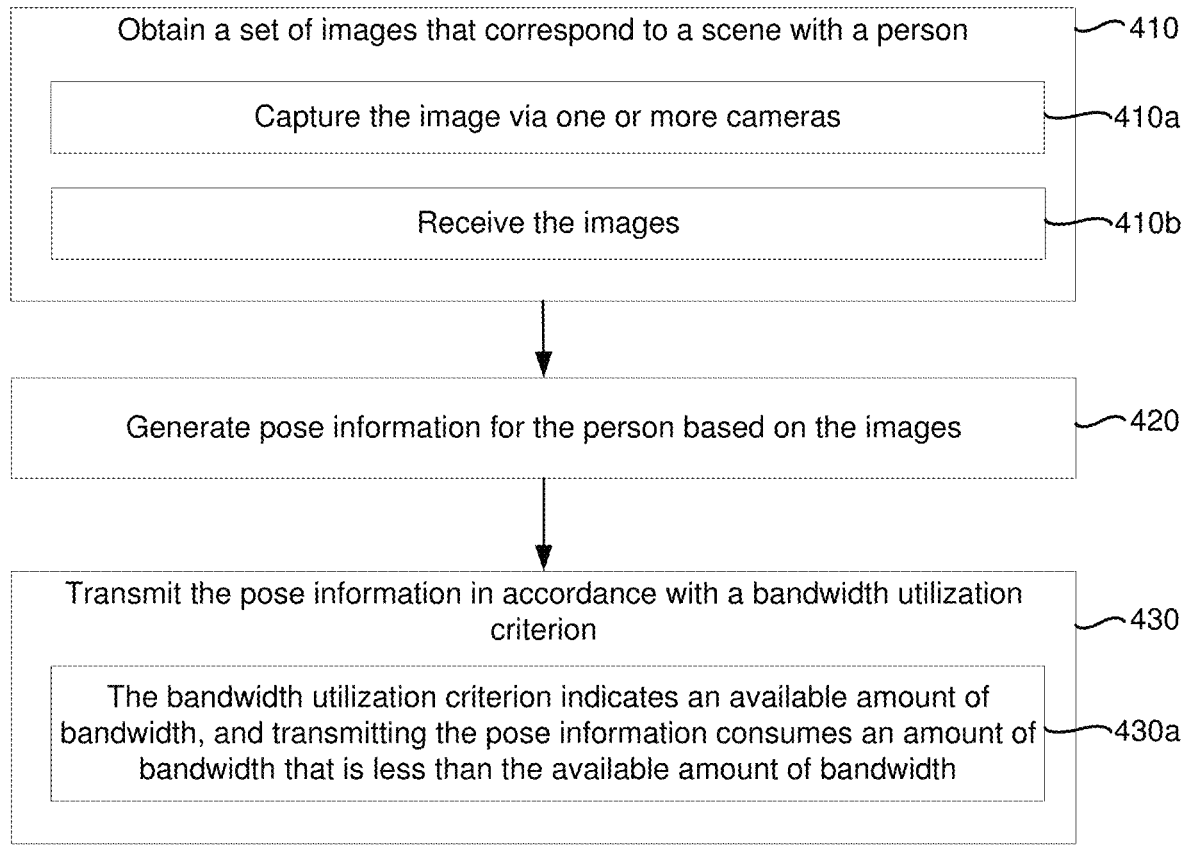
FIGS. 4A-4B are flowchart representations of a method of transmitting scene data in accordance with some implementations.

FIG. 4A is a flowchart representation of a method 400 of transmitting data for a scene. In various implementations, the method 400 is performed by a device with a non-transitory memory, and one or more processors coupled with the non-transitory memory (e.g., the device 100 shown in FIG. 1A). In some implementations, the method 400 is performed by processing logic, including hardware, firmware, software, or a combination thereof. In some implementations, the method 400 is performed by a processor executing code stored in a non-transitory computer-readable medium (e.g., a memory). Briefly, in some implementations, the method 400 includes obtaining a set of images that correspond to a scene with a person, generating pose information for the person based on the images, and transmitting the pose information in accordance with a bandwidth utilization criterion.

As represented by block 410, in various implementations, the method 400 includes obtaining a set of images (e.g., the images 264 shown in FIG. 2) that correspond to a scene with a person (e.g., the persons 50a and 50b shown in FIGS. 1A and 1B). In some implementations, the method 400 includes obtaining a single image of the scene. In some implementations, the method 400 includes including multiple images of the scene. In some implementations, the images correspond to the same field of view. For example, in some implementations, each image in the set is captured from the same field of view. Alternatively, in some implementations, the images correspond to different field of view. For example, in some implementations, some images are captured from a first field of view, whereas other images are captured from a second field of view (e.g., different from the first field of view).

As represented by block 410a, in some implementations, the method 400 includes capturing the set of images via one or more cameras (e.g., the camera 104 shown in FIG. 1A). As represented by block 410b, in some implementations, the method 400 includes receiving the set of images (e.g., from cameras dispersed at the scene 40).

As represented by block 420, in various implementations, the method 400 includes generating pose information for the person based on the set of images (e.g., generating the body pose information 108 for the persons 50a and 50b). In some implementations, the pose information indicates respective positions of body portions of the person. For example, the pose information indicates head positions/orientations 52a and 50b of the persons 50a and 50b, and/or positions/orientations of the joints 54a and 54b of the persons 50a and 50b.

As represented by block 430, in some implementations, the method 400 includes transmitting the pose information in accordance with a bandwidth utilization criterion. As represented by block 430a, in some implementations, the bandwidth utilization criterion indicates an available amount of bandwidth, and transmitting the pose information consumes an amount of bandwidth that is less than the available amount of bandwidth. For example, in some implementations, the device 100 and/or the user device 30 have access to a limited amount of bandwidth. In such implementations, sending a video feed of the scene 40 from the device 100 to the user device 30 exceeds the amount of bandwidth, but transmitting the scene data 106 does not exceed the amount of bandwidth.

Figure 4B:
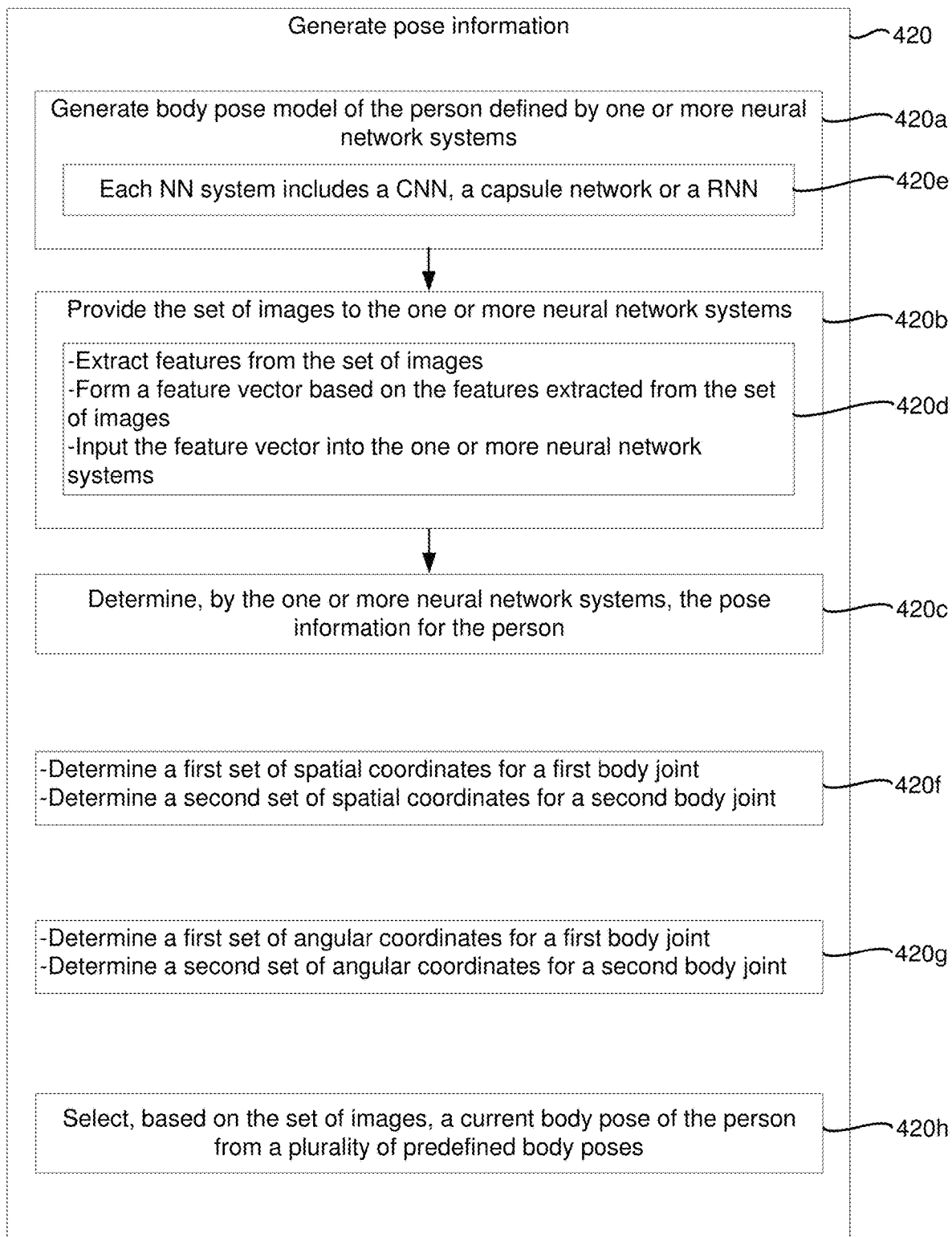

Referring to FIG. 4B, as represented by block 420a, in various implementations, the method 400 includes generating a body pose model of the person defined by one or more neural network systems (e.g., the one or more neural networks 278-1 . . . 278-N shown in FIG. 2). As represented by block 420b, in some implementations, the method 400 includes providing the set of images to the neural network systems (e.g., providing the images 264 to the one or more neural networks 278-1 . . . 278-N). As represented by block 420c, in some implementations, the method 400 includes determining, by the one or more neural networks, the pose information for the person (e.g., the one or more neural networks 278-1 . . . 278-N determine the body pose information 108).

As represented by block 420e, in some implementations, the one or more neural networks includes a convolution neural network (CNN) (e.g., each of the one or more neural networks 278-1 . . . 278-N includes a CNN). In some implementations, the one or more neural networks includes a capsule network (e.g., each of the one or more neural networks 278-1 . . . 278-N includes a capsule network). In some implementations, the one or more neural networks includes a recurrent neural network (RNN) (e.g., each of the one or more neural networks 278-1 . . . 278-N includes an RNN).

As represented by block 420d, in some implementations, the method 400 includes extracting features from the set of images, forming a feature vector based on the features extracted from the set of images, and inputting the feature vector into the one or more neural network systems. For example, the feature extractor 276 extracts features from the images 264, forms a feature vector (e.g., the feature vector 302 shown in FIG. 3A), and provides the feature vector to the one or more neural networks 278-1 . . . 278-N.

As represented by block 420f, in some implementations, the method 400 includes determining a first set of spatial coordinates for a first body joint, and determining a second set of spatial coordinates for a second body joint. For example, determining a set of spatial coordinates for a left shoulder joint of a person, and determining a set of spatial coordinates for a right shoulder joint of the person.

As represented by block 420g, in some implementations, the method 400 includes determining a first set of angular coordinates for a first body joint, and determining a second set of spatial coordinates for a second body joint. For example, determining a set of angular coordinates for a left shoulder joint of a person, and determining a set of angular coordinates for a right should joint of the person.

As represented by block 420h, in some implementations, the method 400 includes selecting, based on the set of images, a current body pose of the person from a plurality of predefined body poses. For example, in some implementations, the method 400 includes classifying the current body pose into one of many predefined body poses (e.g., sitting, standing, running, jumping, etc.).

Figure 5:
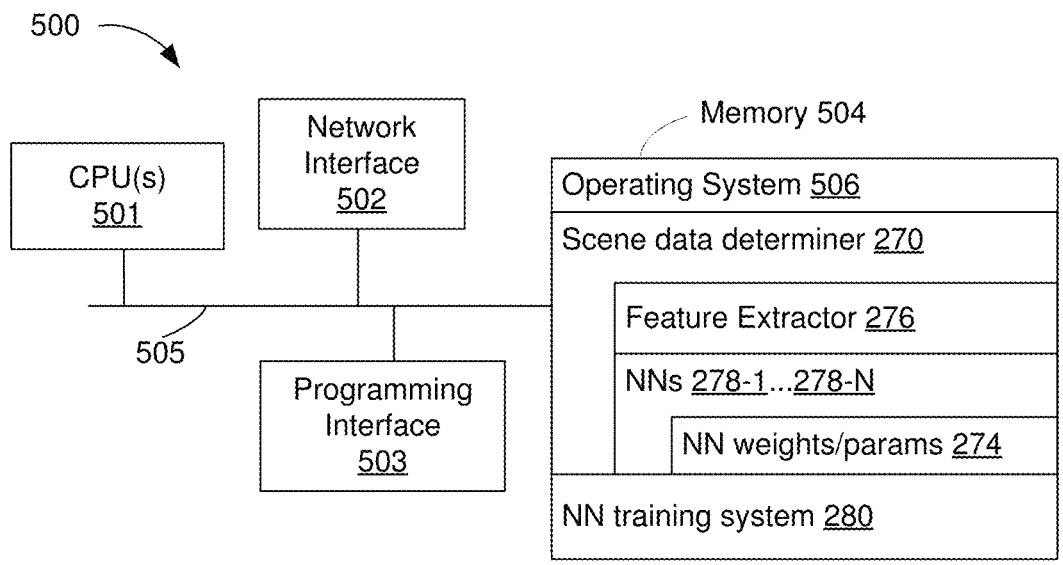
FIG. 5 is a block diagram of a device in accordance with some implementations.

FIG. 5 is a block diagram of a device 500 enabled with one or more components of a device (e.g., the device 100 shown in FIG. 1A) in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 500 includes one or more processing units (CPUs) 501, a network interface 502, a programming interface 503, a memory 504, and one or more communication buses 505 for interconnecting these and various other components.

In some implementations, the network interface 502 is provided to, among other uses, establish and maintain a metadata tunnel between a cloud-hosted network management system and at least one private network including one or more compliant devices. In some implementations, the one or more communication buses 505 include circuitry that interconnects and controls communications between system components. The memory 504 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 504 optionally includes one or more storage devices remotely located from the one or more CPUs 501. The memory 504 comprises a non-transitory computer readable storage medium.

In some implementations, the memory 504 or the non-transitory computer readable storage medium of the memory 504 stores the following programs, modules and data structures, or a subset thereof including an optional operating system 506, the scene data determiner 270, the feature extractor 276, the one or more neural networks 278-1 . . . 278-N, the neural network weights 274, and the neural network training system 280.

Figure 6:
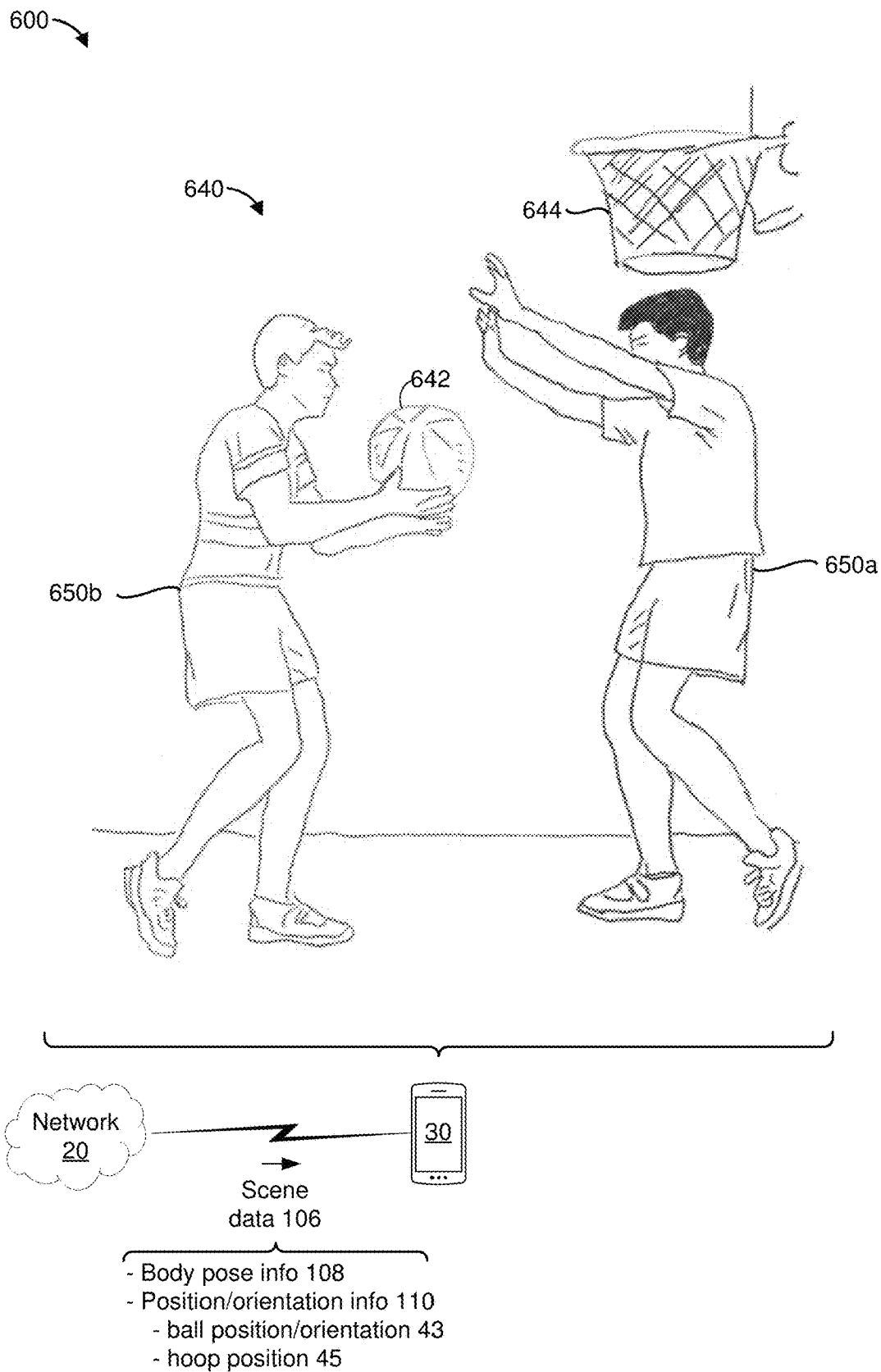
FIG. 6 is a diagram of an example computer-mediated scene in accordance with some implementations.

FIG. 6 illustrates an example computer-generated reality (CGR) environment 600. In the CGR environment 600, the user device 30 utilizes the scene data 106 to generate a CGR scene 640. In the example of FIG. 6, the CGR scene 640 includes a CGR ball representation 642 that represents the ball 42, a CGR hoop representation 644 that represents the hoop 44, and CGR person representations 650a and 650b that represent the persons 50a and at the scene 40.

As can be seen in FIG. 6, the perspective of the CGR scene 640 is different from the perspective of the scene 40. The CGR person representation 650a is towards the right of the CGR scene 640, whereas the person 50a is towards the left of the scene 40. Similarly, the CGR person representation 650b is towards the left of the CGR scene 640, whereas the person 50b is towards the right of the scene 40. In some implementations, the user device 30 receives a user input indicating a user-selected perspective. In such implementations, the user device 30 presents the CGR scene 640 from the user selected perspective. Advantageously, the user device 30 allows the user to view the CGR scene 640 from a perspective that is different from the perspective that the camera 104 captured.

The user device 30 utilizes the scene data 106 to generate the CGR scene 640. In some implementations, the CGR scene 640 is within a degree of similarity to the scene 40. In some implementations, the user device 30 utilizes the body pose information 108 to set poses of the CGR person representations 650a and 650b. As such, the poses of the CGR person representations 650a and 650b are within a degree of similarity to the body poses of the persons 50a and 50b. In some implementations, the user device 30 utilizes the position/orientation information 110 to set the position/orientation of various object representations at the CGR scene 640. As such, the position/orientation of the CGR ball representation 642 is within a degree of similarity to the position/orientation 43 of the ball 42.

Figure 7:
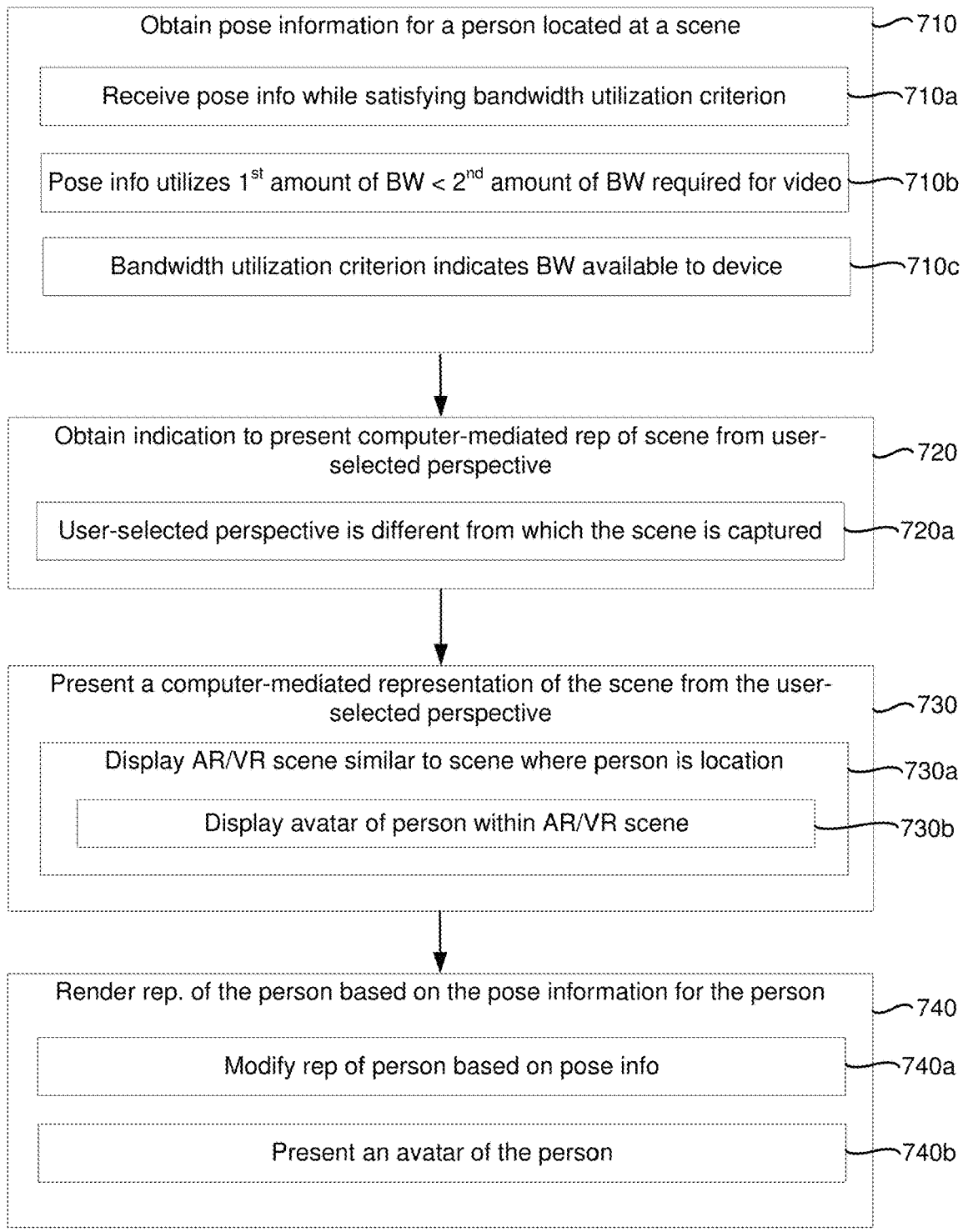
FIG. 7 is a flowchart representation of a method of rendering a computer-mediated representation of a person in accordance with some implementations.

FIG. 7 is a flowchart representation of a method 700 of rendering a computer-mediated representation of a person. In various implementations, the method 700 is performed by a device with a non-transitory memory, and one or more processors coupled with the non-transitory memory (e.g., the user device 30 shown in FIGS. 1A and 6). In some implementations, the method 700 is performed by processing logic, including hardware, firmware, software, or a combination thereof. In some implementations, the method 700 is performed by a processor executing code stored in a non-transitory computer-readable medium (e.g., a memory). Briefly, in some implementations, the method 700 includes obtaining pose information for a person, obtaining an indication to present a computer-mediated representation of the person, presenting a computer-mediated representation of the scene, and rendering a representation of the person based on the pose information for the person.

As represented by block 710, in some implementations, the method 700 includes obtaining pose information for a person located at a scene. For example, as shown in FIG. 6, the user device 30 obtains the body pose information 110 for the persons 50a and 50b. In some implementations, the pose information indicates respective positions of body portions of the person. In some implementations, the pose information satisfies a bandwidth utilization criterion.

As represented by block 710a, in some implementations, the method 700 includes receiving the pose information while satisfying the bandwidth utilization criterion. For example, in some implementations, the body pose information 108 consumes less than a threshold amount of bandwidth (e.g., less than an amount of bandwidth consumed by an image of the scene 40).

As represented by block 710b, in some implementations, the pose information utilizes a first amount of bandwidth that is less than a second amount associated with receiving a video stream of the scene. For example, in some implementations, the body pose information 108 utilizes less bandwidth than a video feed of the scene 40.

As represented by block 710c, in some implementations, the bandwidth utilization criterion indicates an amount of bandwidth that is available to the device. In some implementations, sending an image or a video feed of the scene 40 consumes more bandwidth than the amount of bandwidth that is available to the device. In some implementations, sending the body pose information 108 consumes less bandwidth than the amount of bandwidth that is available to the device.

As represented by block 720, in some implementations, the method 700 includes obtaining an indication to present a computer-mediated representation of the scene from a user-selected perspective. As represented by block 720a, in some implementations, the user-selected perspective is different from a perspective from which the scene is captured. For example, the perspective of the CGR scene 640 is different from the perspective of the scene 40 that the camera 104 captured.

As represented by block 730, in some implementations, the method 700 includes presenting a computer-mediated representation of the scene from the user-selected perspective. For example, presenting the CGR scene 640 shown in FIG. 6. As represented by block 730a, in some implementations, the method 700 includes displaying an augmented reality (AR) scene. In some implementations, the method 700 includes displaying a virtual reality (VR) scene. In some implementations, the computer-mediated scene is within a degree of similarity to the scene where the person is located. For example, the CGR scene 640 is within a degree of similarity to the scene 40.

As represented by block 730b, in some implementations, the method 700 includes displaying an avatar of the person within the computer-mediated scene. In some implementations, the method 700 includes displaying a CGR representation of the person with the CGR scene. For example, in some implementations, the method 700 includes displaying an AR representation of the person with an AR scene. In some implementations, the method 700 includes displaying a VR representation of the person with a VR scene.

As represented by block 740, in some implementations, the method 700 includes rendering, within the computer-mediated representation of the scene, a representation of the person based on the pose information for the person. For example, rendering the CGR person representations 650a and 650b for the persons 50a and 50b in the CGR scene 640.

As represented by block 740a, in some implementations, the method 700 includes modifying the representation of the person based on the pose information for the person. For example, modifying the CGR person representations 650a and 650b based on the body pose information 108 for the persons 50a and 50b.

As represented by block 740b, in some implementations, the method 700 includes presenting an avatar of the person. In some implementations, a pose of the avatar is within a degree of similarity to a pose of the person indicated by the pose information. For example, a pose of the CGR person representation 650a is within a degree of similarity to a pose of the person 50a indicated by the body pose information 108. Similarly, a pose of the CGR person representation 650b is within a degree of similarity to a pose of the person 50b indicated by the body pose information 108.

Figure 8:
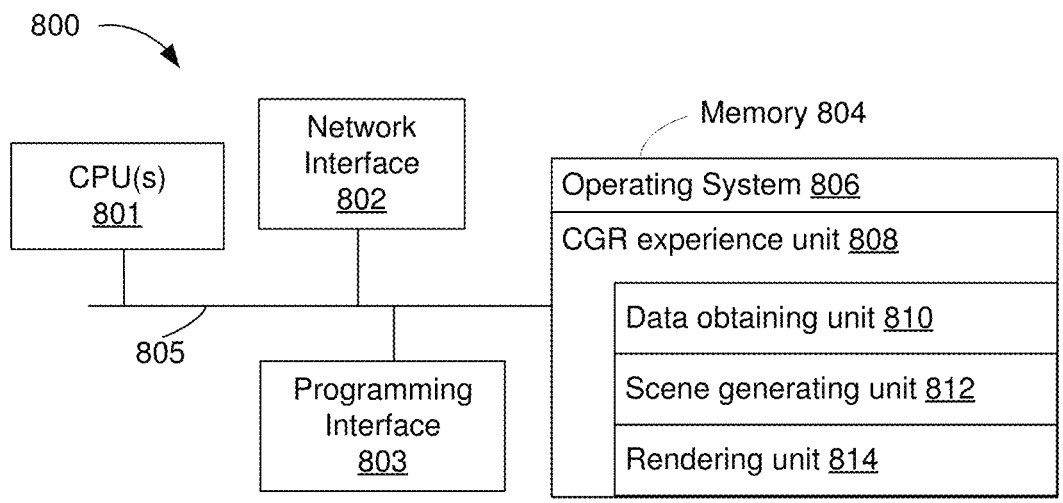
FIG. 8 is a block diagram of another device is accordance with some implementations.

FIG. 8 is a block diagram of a device 800 enabled with one or more components of a device (e.g., the user device 100 shown in FIGS. 1A and 6) in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 800 includes one or more processing units (CPUs) 801, a network interface 802, a programming interface 803, a memory 804, and one or more communication buses 805 for interconnecting these and various other components.

In some implementations, the network interface 802 is provided to, among other uses, establish and maintain a metadata tunnel between a cloud hosted network management system and at least one private network including one or more compliant devices. In some implementations, the one or more communication buses 805 include circuitry that interconnects and controls communications between system components. The memory 804 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 804 optionally includes one or more storage devices remotely located from the one or more CPUs 801. The memory 804 comprises a non-transitory computer readable storage medium.

In some implementations, the memory 804 or the non-transitory computer readable storage medium of the memory 804 stores the following programs, modules and data structures, or a subset thereof including an optional operating system 806 and a CGR experience unit 808. In some implementations, the CGR experience unit 808 enables the device 800 to present a CGR experience (e.g., the CGR scene 640 shown in FIG. 6). In some implementations, the CGR experience unit 808 includes a data obtaining unit 810, a scene generating unit 812, and a rendering unit 814.

In various implementations, the data obtaining unit 810 obtains (e.g., receives) data corresponding to a real-world scene. For example, in some implementations, the data obtaining unit 810 obtains the scene data 106 (e.g., the body pose information 108 and/or the position/orientation information 110) corresponding to the scene 40. To that end, the data obtaining unit 810 includes instructions and/or logic, and heuristics and metadata.

In various implementations, the scene generating unit 812 generates a computer-mediated scene based on data obtained by the data obtaining unit 810. In some implementations, the scene generating unit 812 determines a pose of a computer-mediated representation of a person based on body pose information for the person. To that end, the scene generating unit 812 includes instructions and/or logic, and heuristics and metadata.

In various implementations, the rendering unit 814 renders a computer-mediated representation of the person based on the body pose information for the person. In some implementations, a pose of the computer-mediated representation of the person is within a degree of similarity to a pose of the person. To that end, the rendering unit 814 includes instructions and/or logic, and heuristics and metadata.

As described herein, in order to provide immersive media experiences to a user, computing devices present computer-generated reality that intertwines computer-generated media content (e.g., including images, video, audio, smells, haptics, etc.) with real-world stimuli to varying degrees—ranging from wholly synthetic experiences to barely perceptible computer-generated media content superimposed on real-world stimuli. To these ends, in accordance with various implementations described herein, computer-generated reality (CGR) systems, methods, and devices include mixed reality (MR) and virtual reality (VR) systems, methods, and devices. Further, MR systems, methods, and devices include augmented reality (AR) systems in which computer-generated content is superimposed (e.g., via a transparent display) upon the field-of-view of the user and composited reality (CR) systems in which computer-generated content is composited or merged with an image of the real-world environment. While the present description provides delineations between AR, CR, MR, and VR for the mere sake of clarity, those of ordinary skill in the art will appreciate from the present disclosure that such delineations are neither absolute nor limiting with respect to the implementation of any particular CGR system, method, and/or device. Thus, in various implementations, a CGR environment include elements from a suitable combination of AR, CR, MR, and VR in order to produce any number of desired immersive media experiences.

In various implementations, a user is present in a CGR environment, either physically or represented by an avatar (which may be virtual or real, e.g., a drone or robotic avatar). In various implementations, the avatar simulates some or all of the physical movements of the user.

A CGR environment based on VR may be wholly immersive to the extent that real-world sensory inputs of particular senses of the user (e.g., vision and/or hearing) are completely replaced with computer-generated sensory inputs. Accordingly, the user is unable to see and/or hear his/her real-world surroundings. CGR environments based on VR can utilize (spatial) audio, haptics, etc. in addition to computer-generated images to enhance the realism of the experience. Thus, in various implementations, real-world information of particular senses provided to the user is limited to depth, shape, orientation, and/or layout information; and such real-world information is passed indirectly to the user. For example, the walls of real-world room are completely skinned with digital content so that the user cannot see the real-world walls as they exist in reality.

A CGR environment based on mixed reality (MR) includes, in addition to computer-generated media content, real-world stimuli received by a user either directly, as in the case of a CGR environment based on augmented reality (AR), or indirectly, as in the case of a CGR environment based on composited reality (CR).

A CGR environment based on augmented reality (AR) includes real-world optical passthrough such that real-world light enters a user's eyes. For example, in an AR system a user is able to see the real world through a transparent surface, and computer-generated media content (e.g., images and/or video) is projected onto that surface. In particular implementations, the media content is projected onto the surface to give the visual impression that the computer-generated media content is a part of and/or anchored to the real-world. Additionally or alternatively, the computer-generated image data may be projected directly towards a user's eyes so that real-world light and the projected light of the computer-generated media content concurrently arrive on a user's retinas.

A CGR environment based on composited reality (CR) includes obtaining real-world stimulus data obtained from an appropriate sensor and compositing the real-world stimulus data with computer-generated media content (e.g., merging the stimulus data with the computer-generated content, superimposing the computer-generated content over portions of the stimulus data, or otherwise altering the real-world stimulus data before presenting it to the user) to generated composited data. The composited data is then provided to the user, and thus the user receives the real-world stimulus indirectly, if at all. For example, for visual portions of a CGR environment based on CR, real-world image data is obtained using an image sensor, and the composited image data is provided via a display.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a device including a sensor, a non-transitory memory, and one or more processors coupled with the sensor and the non-transitory memory:
obtaining, via the sensor, sensor data that corresponds to a physical environment that includes an object;
determining pose information for the object based on the sensor data; and
transmitting the pose information using a first amount of bandwidth that is less than a second amount of bandwidth associated with transmitting the sensor data.

2. The method of claim 1, wherein the sensor comprises an image sensor;
wherein obtaining the sensor data comprises capturing a set of one or more images by the image sensor; and
wherein determining the pose information includes generating the pose information based on the set of one or more images captured by the image sensor.

3. The method of claim 1, further comprising:
forgoing transmission of the sensor data.

4. The method of claim 1, wherein determining the pose information comprises:
providing the sensor data to a neural network system; and
determining, by the neural network system, the pose information for the object.

5. The method of claim 4, wherein providing the sensor data to the neural network system comprises:
generating a feature vector based on features extracted from the sensor data; and
inputting the feature vector into the neural network system.

6. The method of claim 4, wherein the neural network system comprises a convolution neural network (CNN), a capsule network, or a recurrent neural network (RNN).

7. The method of claim 1, wherein obtaining the sensor data comprises receiving the sensor data from a wearable computing device that a person is wearing.

8. The method of claim 1, wherein determining the pose information for the object comprises determining a position of the object within the physical environment.

9. The method of claim 1, wherein determining the pose information for the object comprises determining an orientation of the object.

10. A method comprising:
at a device including a display, a non-transitory memory, and one or more processors coupled with the display and the non-transitory memory:
obtaining pose information for an object in a physical environment, wherein obtaining the pose information uses a first amount of bandwidth that is less than a second amount of bandwidth associated with obtaining sensor data that corresponds to the physical environment;
displaying, on the display, a representation of the object; and
manipulating the representation of the object based on the pose information.

11. The method of claim 10, wherein displaying the representation of the object comprises:
generating a computer-generated reality (CGR) environment that corresponds to the physical environment; and
displaying the representation of the object within the CGR environment as a virtual object.

12. The method of claim 10, wherein the pose information for the object indicates a position of the object within the physical environment; and
wherein manipulating the representation of the object includes moving the representation of the object to a display location that corresponds to the position of the object within the physical environment.

13. The method of claim 10, wherein the pose information for the object indicates an orientation of the object; and
wherein manipulating the representation of the object includes rotating the representation of the object based on the orientation of the object.

14. The method of claim 10, wherein displaying the representation of the object comprises:
displaying the representation from a user-selected perspective that is different from a perspective from which the sensor data corresponding to the physical environment was captured.

15. A device comprising:
one or more processors;
a non-transitory memory;
a sensor; and one or more programs stored in the non-transitory memory, which, when executed by the one or more processors, cause the device to:
- obtain, via the sensor, sensor data that corresponds to a physical environment that includes an object;
- determine pose information for the object based on the sensor data; and
- transmit the pose information using a first amount of bandwidth that is less than a second amount of bandwidth associated with transmitting the sensor data.

16. The device of claim 15, wherein the sensor comprises an image sensor;
- wherein obtaining the sensor data comprises capturing a set of one or more images by the image sensor; and
- wherein determining the pose information includes generating the pose information based on the set of one or more images captured by the image sensor.

17. The device of claim 15, wherein the one or more programs further cause the device to:
- forgo transmission of the sensor data.

18. The device of claim 15, wherein determining the pose information comprises:
- providing the sensor data to a neural network system; and
- determining, by the neural network system, the pose information for the object.

19. The device of claim 15, wherein determining the pose information for the object comprises:
- determining a position of the object within the physical environment; and
- determining an orientation of the object.

20. The device of claim 15, wherein obtaining the sensor data comprises receiving the sensor data from a wearable computing device that a person is wearing.

21. The device of claim 15, wherein the device comprises a head-mountable device (HMD).

22. A device comprising:
- a display;
- one or more processors;
- a non-transitory memory; and
- one or more programs stored in the non-transitory memory, which, when executed by the one or more processors, cause the device to:
  - obtain pose information for an object in a physical environment, wherein obtaining the pose information uses a first amount of bandwidth that is less than a second amount of bandwidth associated with obtaining sensor data that corresponds to the physical environment;
  - display, on the display, a representation of the object; and
  - manipulate the representation of the object based on the pose information.

23. The device of claim 22, wherein displaying the representation of the object comprises:
- generating a computer-generated reality (CGR) environment that corresponds to the physical environment; and
- displaying the representation of the object within the CGR environment as a virtual object.

24. The device of claim 22, wherein the pose information for the object indicates a position of the object within the physical environment; and
- wherein manipulating the representation of the object includes moving the representation of the object to a display location that corresponds to the position of the object within the physical environment.

25. The device of claim 22, wherein displaying the representation of the object comprises:
- displaying the representation from a user-selected perspective that is different from a perspective from which the sensor data corresponding to the physical environment was captured.

* * * * *